United States Patent [19]
Ho et al.

[11] Patent Number: 5,236,961
[45] Date of Patent: Aug. 17, 1993

[54] WATER-BLOWN INTEGRAL SKIN POLYURETHANE FOAMS HAVING A SKIN WITH ABRASION RESISTANCE

[75] Inventors: David J. Ho, Grosse Ile; David B. McCulloch, Southgate, both of Mich.

[73] Assignee: BASF Corporation, Parsippany, N.J.

[21] Appl. No.: 999,514

[22] Filed: Dec. 30, 1992

[51] Int. Cl.$^5$ ............................................. C08J 9/34
[52] U.S. Cl. ................................ 521/51; 521/111; 521/116; 521/174; 521/176
[58] Field of Search ................ 521/51, 111, 116, 174, 521/176

[56] References Cited

U.S. PATENT DOCUMENTS 5,114,980  5/1992  Lii et al. .................. 521/51
5,132,329  7/1992  Lynch et al. ............. 521/51

Primary Examiner—Morton Foelak
Attorney, Agent, or Firm—Dennis V. Carmen

[57] ABSTRACT

The invention pertains to a water blown integral skin polyurethane foam having a skin with good abrasion resistance. The foam is manufactured by employing as a polyol composition a polyol having a functionality of from 1.75 to 2.65 and a molecular weight of from 1500 to 5000 along with a surfactant and water as a blowing agent. The particular surfactant is a particular siloxane or an ethylene oxide adduct of octylphenol.

5 Claims, No Drawings

WATER-BLOWN INTEGRAL SKIN POLYURETHANE FOAMS HAVING A SKIN WITH ABRASION RESISTANCE

1. FIELD OF THE INVENTION

The present invention pertains to integral skin polyurethane foams, more particularly to integral skin polyurethane foams blown with water having formed thereon an abrasion resistant skin.

2. BACKGROUND OF THE ART

The polyurethane industry is well underway researching and developing alternative blowing agents for rigid, semi-rigid, and flexible polyurethane foams and microcellular foams which are environmentally friendly while yielding foam properties equivalent to those possess by CFC-blown foams. Many efforts at developing water-blown integral skin foams have met little success because the skin formation has been of poor quality. It is desirable to form a dense, tough skin to provide resistance to abrasion and tear, properties which are particularly important in applications where the foam is subject to frequent manual handling.

These objects are difficult to meet with water-blown foams since carbon dioxide evolved in the chemical reaction between water and isocyanate condenses at relatively high temperatures. Rather than condensing at the mold surface, the carbon dioxide gas escapes from the surface of the foaming mass and out through the vent holes of the mold, forming only a thin skin which peels and easily abrades. Attempts at increasing mold pressure by packing a greater amount of raw material so as to reduce the condensation point of the gas have also not met with success.

In our co-pending application Ser. No. 07/902,137, it was discovered that a certain combination of a modified prepolymer with various resin side ingredients produced an extremely tough and abrasion-resistant skin which exhibited no peeling, porosity, or surface deformities.

3. SUMMARY OF THE INVENTION

It is an object of the invention to produce a water-blown integral skin polyurethane foam with a skin having good abrasion resistance. This object has been met by employing a low functionality polyoxyalkylene polyether polyol with a particular cell-opening surfactant, a chain extender, and water as the blowing agent to react with an organic aromatic polyisocyanate. A feature of the invention is that the foam ingredients are reacted in the absence of a tin catalyst.

4. DETAILED DESCRIPTION OF THE INVENTION

Without being bound to a theory, it is believed that an abrasion resistant skin for water-blown foams in this invention is obtained by using slow reacting ingredients in combination with one of two particular cell-opening surfactants to obtain the effect of cell collapse at the surface of the foam before gelation occurs. It is critical to the invention that low functionality polyether polyols in combination with cell-opening surfactants are employed in the water-blown foam. A fast reacting system will cause the foam at the surface to gel, thus preventing foam collapse. It is necessary to slow the reaction rate to allow the opened cells to collapse and develop a dense tough zone at the surface. The surfactant is one which promotes cell opening. If the surface cells would remain in a closed state, they would fail to collapse and form a dense zone. Thus, by opening the cells using the cell-opening surfactant and slowing the reaction rate by using low functional polyether polyols to collapse the open cells prior to gelation, one obtains an integral skin foam having an abrasion resistant skin.

Suitable polyoxyalkylene polyether polyols are those with an average functionality of about 1.75 to 2.65, preferably 1.8 to 2.4, with a molecular weight ranging from 1,500 to 5,000. Methods for the preparation of polyether polyols are well known and described in U.S. Pat. Nos. 1,922,459; 3,190,927; and 3,346,557, and in the *Polyurethane Handbook* and *Polyurethanes: Chemistry and Technology*. Generally, the polyether polyol is prepared by the base catalyzed addition of an alkylene oxide, preferably ethylene oxide (oxirane), propylene oxide (methyloxirane) or butylene oxide (ethyloxirane) to an initiator molecule containing on the average two or three active hydrogens. Examples of preferred initiator molecules are dihydric initiators such as ethylene glycol, propylene glycol, butylene glycol, neopentyl glycol, 1,6-hexanediol, hydroquinone, resorcinol, the bisphenols, aniline and other aromatic monoamines, aliphatic monoamines, and monoesters of glycerine; and trihydric initiators such as glycerine, trimethylolpropane, trimethylolethane, N-alkylphenylenediamines, mono-, di-, and trialkanolamines.

Addition of alkylene oxide to the initiator molecules may take place simultaneously or sequentially when more than one alkylene oxide is used, resulting in block, heteric, and block-heteric polyoxyalkylene polyethers preferably terminated with a secondary hydroxyl group to slow the reaction rate further. Thus, propylene oxide and butylene oxide are preferred monomers with which the reaction between the initiator molecule and the alkylene oxide is terminated. In a more preferred embodiment, the initiator molecule is reacted only with propylene oxide.

Also suitable as the polyol are polymer-modified polyols, in particular the so-called graft polyols having the above-stated average functionalities. Graft polyols are well known to the art and are prepared by the in situ polymerization of one or more vinyl monomers, preferably acrylonitrile and styrene, in the presence of a polyether or polyester polyol, particularly polyols containing a minor amount of natural or induced unsaturation. Methods of preparing such graft polyols may be found in columns 1-5 and in the Examples of U.S. Pat. No. 3,652,639; in columns 1-6 and the Examples of U.S. Pat. No. 3,823,201; particularly in columns 2-8 and the Examples of U.S. Pat. No. 4,690,956; and in U.S. Pat. No. 4,524,157; all of which patents are herein incorporated by reference.

To form an integral skin polyurethane foam having an abrasion resistant skin, it is necessary to employ a cell-opening surfactant. The first surfactant is a dimethylsiloxane polymer that is 100 percent active having the following structure:

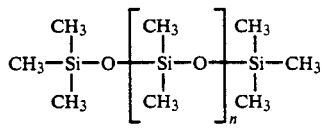

where n is from 0 to 10, preferably from 0 to 5.

An example of a suitable surfactant is DC-200-5 having a 5 cst viscosity commercially available from Dow Corning.

A second surfactant used in the invention to produce an abrasion resistant skin is an ethylene oxide adduct of 1,1,3,3-tetramethylbutylphenol, having the structure:

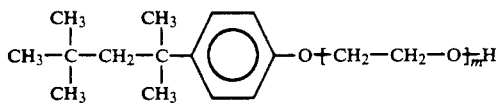

where m is from 1 to 15, preferably 8 to 12.

Commercially available ethylene oxide adducts are sole under the name Triton X-100 by Union Carbide or Iconol OP series, such as Iconol OP-10 having 10 ethylene oxide units added to octylphenol.

Other surfactants commonly available have been tested without success. By employing one of these two particular surfactants in a water-blown foam using polyols having an average functionality of about 1.75 to 2.65, one obtains a foam having an abrasion resistant integral skin around a cellular core. The abrasion resistance of the skin is less than 200 mg of material lost/1000 cycles, preferably less than 100 mg/1000 cycles, more preferably less than 75 mg/1000 cycles of foam lost according to ASTM 1630.

The amount of surfactant added is effective to yield a foam having an integral skin which is abrasion resistant. Suitable amounts range from 0.1 weight percent to 5 weight percent, preferably 1.0 weight percent to 3.5 weight percent, based on the weight of the polyol composition.

Suitable catalysts to promote the formation of urethane linkages include the tertiary amines such as, for example, triethylenediamine, N-methylmorpholine, N-ethylmorpholine, diethylaminoethanol, N-lauryl morpholine, 1-methyl-4-(dimethylaminoethyl)piperazine, 3-methoxy-N,N'-dimethylpropylamine,N,N,N'-trimethylisopropylpropylenediamine,N,N,N,N'-tetraethylpropylenediamine, dimethylbenzylamine, mixtures thereof and the like. Examples of such commercially available catalysts are the DABCO ® catalyst series available through Air Products Corp.

Other catalysts typically used in the formation of polyurethane are, for example, tin compounds such as stannous chloride, tin salts of carboxylic acids, such as dibutyltin di-2-ethylhexanoate and stannous octoate, available under the FOMREZ ® trademark, and other organic metallic compounds such as are disclosed in U.S. Pat. No. 2,846,408. The tin-based catalysts, however, greatly increase the reaction rate between the active hydrogens and isocyanate groups and thereby shorten the gel time. Therefore, in this invention, the reaction proceeds in the absence of any appreciable amount of tin-based catalysts and in the presence of only those catalysts which promote a slower reaction rate, such as the tertiary amine catalysts. It is not outside the scope of the invention to include minor amounts of tin catalyst so long as the gel time is sufficiently long to permit cell collapse at the surface of the foaming mass prior to gelation.

The total amount of catalyst in the invention ranges from 0.1 weight percent to 2.0 weight percent, and preferably used are solely tertiary amine catalysts in an amount of from 0.3 weight percent to 1.5 weight percent.

The blowing agent of choice is exclusively water in amounts ranging from 0.4 weight percent to 2.0 weight percent. The particular amount employed will depend upon the desired density.

Chain extenders/crosslinkers employed in the preparation of the integral skin polyurethane foams are those generally used in the industry, such as water, hydrozene, primary and secondary diamines, amino alcohols, amino acids, hydroxy acids, glycols, and mixtures thereof. A preferred group includes ethylene glycol, 1,4-butanediol, diethylene glycol, or propylene glycol. Other chain extenders include ethylene diamine, diethylenetriamine, piperazine, phenylenediamine, and other primary and secondary diamines which react with the isocyanate groups faster than water does. The amount of chain extender present is from 2.0 weight percent to 10 weight percent.

Additives may optionally be used in the process of the present invention and include known pigments such as carbon black, dyes, and flame retarding agents (e.g., trischloroethyl phosphates or ammonium phosphate and polyphosphate), stabilizers against aging and weathering, plasticizers, such as gamma butyrolactone, fungistatic and bacteriostatic substances, and fillers.

The water-blown polyurethane system is run at an index of 60 to 150, preferably 90 to 115, more preferably 95 to 105, most preferably at 100. The index of the system is defined as the NCO/active hydrogen ratio equivalent multiplied by 100. In calculating the quantity of active hydrogens present, all active hydrogen-containing compounds other than non-dissolving solids are taken into account, including polyols, chain extenders, functional plasticizers, etc.

Organic polyisocyanates which may be employed include aromatic, aliphatic, and cycloaliphatic polyisocyanates and combinations thereof. Representative of these types are the diisocyanates such as m-phenylene diisocyanate, 2,4-toluene diisocyanate, 2,6-toluene diisocyanate, mixtures of 2,4- and 2,6-toluene diisocyanate, hexamethylene diisocyanate, tetramethylene diisocyanate, cyclohexane-1,4-diisocyanate, hexahydrotoluene diisocyanate (and isomers), naphthalene-1,5-diisocyanate, 1-methoxyphenyl-2,4-diisocyanate, 4,4'-diphenylmethane diisocyanate, 4,4'-biphenylene diisocyanate, 3,3'-dimethoxy-4,4'-biphenyl diisocyanate, 3,3'-dimethyl-4,4'-biphenyl diisocyanate, and 3,3'-dimethyl-diphenylmethane-4,4'-diisocyanate; the triisocyanates such as 4,4',4"-triphenylmethane triisocyanate, and toluene 2,4,6-triisocyanate; and the tetraisocyanates such as 4,4'-dimethyldiphenylmethane-2,2'-5,5'-tetraisocyanate; and polymeric polyisocyanates such as polymethylene polyphenylene polyisocyanate. Especially useful due to their availability and properties are toluene diisocyanate, 4,4'-diphenylmethane diisocyanate and polymethylene polyphenylene polyisocyanate.

Crude polyisocyanates may also be used in the compositions of the present invention, such as crude toluene diisocyanate obtained by the phosgenation of a mixture of toluene diamines or crude diphenylmethane isocyanate obtained by the phosgenation of crude diphenylmethane diamine. The preferred or crude isocyanates are disclosed in U.S. Pat. No. 3,215,652.

The mechanical parameters of the instant process are flexible and depend on the final application of the integral skin polyurethane foam. The reaction system is versatile enough that it may be made in a variety of densities and hardnesses. The system may be introduced into a mold in a variety of ways known to those skilled in the art. It may be shot into a preheated closed mold via high pressure injection technique. In this manner, it processes well enough to fill molds at low mold densities from 20 pcf to 40 pcf, preferably from 25 pcf to 32 pcf. It may also be run using a conventional open mold technique wherein the reaction mixture or system is poured or injected at low pressure or atmospheric pressure into a preheated open mold. In the instant process, the system may be run at mold temperatures from about 85° F. to about 135° F. with from 115° F. to about 135° F. being preferred.

EXAMPLES

The following examples will illustrate the nature of the invention. All amounts are in weight percent unless otherwise stated:

Polyol A is a propylene oxide-ethylene oxide adduct of dipropylene glycol terminated with 18 weight percent ethylene oxide and having a nominal functionality of about 1.8 and an OH number of about 29.

Polyol B is a propylene oxide-ethylene oxide adduct of trimethylolpropane terminated with 15 weight percent ethylene oxide having a nominal functionality of about 2.3 and a hydroxyl number of about 25.

Polyol C is a 31 weight percent 1:1 acrylonitrile:styrene solids dispersed in a propylene oxide-ethylene oxide adduct of trimethylolpropane, having a functionality of about 2.3.

DABCO DC-1 is a delayed action amine-based catalyst available from Air Products Corp.

DABCO 8154 is a delayed action acid-blocked version of triethanoldiamine available from Air Products Corp.

I-460 is a 25/75 ratio of amine catalyst in butanediol.

Triton X-100 is an ethyoxylated 1,1,3,3,-tetramethylbutylphenol surfactant commercially available from Union Carbide Corp.

Iso A is a blend of 49.435 weight percent 4,4'-diphenylmethane diisocyanate (MDI), 2.84 weight percent of 2,4'-MDI, 39.055 weight percent of three ring or greater polymeric MDI, and 8.67 weight percent of a prepolymer obtained by reacting a 400 molecular weight glycol with 4,4'-MDI.

Iso B is a prepolymer obtained by reacting 25 weight percent of an ethylene oxide/propylene oxide adduct of trimethylolpropane terminated with 4.8 weight percent ethylene oxide having a molecular weight of 4570 and an OH number of 26.6 with 70 weight percent of 4,4'-MDI and blending the product with 5 weight percent of a carbodiimide-uretonimine modified MDI comprising 25 weight percent of the carbodiimide-uretonimine modification and 75 weight percent of 4,4'-MDI.

Iso C is a polymeric-MDI having 46.5 weight percent 4,4'-MDI, the remainder comprising three ringed or greater oligomers.

A polyurethane high pressure impingement mixing machine was loaded with the polyol composition and the isocyanate composition. The polyol composition comprised 60 pbw of Polyol A; 30 pbw of Polyol B; 10 pbw of Polyol C; 6.0 pbw of ethylene glycol chain extender; 2.0 pbw of triethanolamine; 0.8 pbw of water; 2.0 pbw of a catalyst blend comprising an 80/12/8 weight ratio of I-460, DABCO DC-1, and DABCO 8154, respectively; and 3.0 pbw of Triton X-100.

The isocyanate composition comprised 80 pbw of Iso B, 20 pbw of Iso A, and 20 pbw of Iso C. The polyol composition and the isocyanate composition was mixed at an index of 100 in an impingement mix head at a throughput of about 250 g/s and injected into a closed steering wheel mold for about six (6) seconds.

The molded part was then subjected to testing and had the following properties: Density overall, 26 pcf; core, 22 pcf; Shore A Hardness, instant 65, after five seconds 57; Skin thickness, 0.05 inches; Tensile strength, Skin 416 psi; core, 200 psi; skin and core, 333 psi; Split Tear skin, 25 pi; skin and core, 19 pi; core, 12 pi; Graves Tear skin, 71 pi; skin and core, 54 pi; core only, 26 pi; Elongation skin 160 percent; skin and core, 136 percent; and core, 130 percent; 50 percent compression set 23.5 percent; and abrasion was 54 mg/1000 cycles. Thus, the water-blown foam of the invention possesses a skin having good abrasion resistance.

What I claim is:

1. An integral skin polyurethane foam having an abrasion resistance less than 200 mg/1000 cycles obtained by reacting an organic polyisocyanate with a polyol composition comprising:
   A) a polyoxyalkylene polyether polyol having an average functionality of from 1.75 to 2.65 and an average molecular weight from 1500 to 5000;
   B) a surfactant;
   C) a blowing agent consisting essentially of water;
   D) a chain extender; and,
   E) a polyurethane promoting catalyst;
   wherein the polyol composition and the organic polyisocyanate are devoid of any tin-based polyurethane catalysts; and wherein said surfactant comprises a silicone-based compound having the general formula:

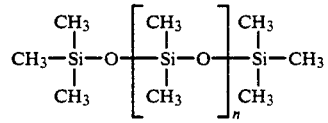

where n is from 0 to 10; or an ethylene oxide adduct of octyl phenol having the general formula:

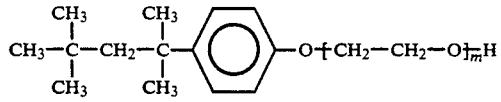

where m is from 1 to 15.

2. The integral skin polyurethane foam of claim 1 wherein the skin has an abrasion resistance of less than 100 mg/1000 cycles.

3. The integral skin polyurethane foam of claim 1, wherein the overall density of the foam is from 20 pcf to 40 pcf.

4. The integral skin polyurethane foam of claim 1, wherein the surfactant consists of said silicone-based compound.

5. The integral skin polyurethane foam of claim 1, wherein the surfactant consists of said ethylene oxide adduct of octyl phenol.

* * * * *